UNITED STATES PATENT OFFICE.

IRA WOOD, OF WOODSTOCK, VERMONT.

IMPROVED COMPOSITION FOR TANNING.

Specification forming part of Letters Patent No. 81,237, dated August 18, 1868.

*To all whom it may concern:*

Be it known that I, IRA WOOD, of Woodstock, in the county of Windsor and State of Vermont, have invented certain new and useful Improvements in Tanning Hides and Skins, of which the following is a full, clear, and exact description.

This invention relates to a new and improved liquid for tanning hides and skins, and has for its object to produce leather which will be exceedingly tough and strong, and either very pliable, limber, and soft, or more firm and solid, according to the use for which it is intended; and my said invention consists of a tanning-liquid made from the leaves of the oak and the maple, or from the leaves of the willow, or of the three combined, or by the addition of the leaves of the beech, in about equal proportions, when combined with alum, Glauber's salt, and nitric acid, in the proportions and in the manner hereinafter specified.

In making my improved tanning-liquid, I take, of about equal parts, by bulk or weight, oak-leaves and maple-leaves, place them in a brass or copper vessel, as many as can be well crowded or pressed down below the top; then put in as much water as will nearly or quite cover them, and apply sufficient heat to boil smartly for about one hour; then strain off the liquid, and, to about twenty gallons of the same, add about eight pounds of pulverized alum, about six pounds of Glauber's salt, and about two ounces of nitric acid, and stir or agitate the whole till well mixed.

This liquid should be allowed to cool to about blood-heat, or cooler, and the hides or skins (after having been prepared in the usual way) placed in the liquid, and thoroughly worked or handled for ten or twelve hours, or till well stained or colored, after which they may remain at rest, adding from time to time more of the liquid, made from boiling the leaves, to strengthen the liquor during the process of tanning, but no more of the alum, salt, or acid need be added after the first.

This improved tanning-liquid produces very firm and tough leather, suitable for machine-belting, for harness, or for pump-leather, and for many other purposes where a very tough, strong leather is required.

For tanning sole-leather, after the first part of the process has been performed—viz., till the hides are well stained or colored—the improved tanning-liquid should be strengthened from time to time with good bark-liquor. This will produce sole-leather of a superior quality, very plump and thick, and, at the same time, of the usual hardness; but, as bark-liquor is very old, I make no claim to its use.

Instead of the leaves of the oak and the maple alone, and to produce softer leather, and of a different color, as calf-skin, used for some kinds of shoes, or for other purposes, I use the leaves of the willow with the other two kinds, and these willow-leaves not only tend to make the leather softer and more pliable, and to change the color, but they prevent the liquor from souring, fermenting, or foaming, even in very warm weather, which I find to be very important.

To produce leather of a different color from that produced by the use of the leaves of the willow, I use the leaves of the beech, and in about the same proportion of the others—that is, about equal parts of each. These beech-leaves contain less of the tanning property than either of the others; but they aid in the tanning process, and change the color of the leather.

Instead of the leaves of the oak and the maple, and to produce very soft leather, to be used without further coloring, I make the tanning-liquor of the leaves of willow alone, and then add the alum, the Glauber's salt, and the nitric acid, as with the liquor made from the leaves of the oak and the maple, and as first described.

This liquid (like the first) must be strengthened with more of the leaf-liquor, or with bark-liquor, from time to time during the process of tanning the hides, which will be fully understood by all practical tanners.

Steam may be used for extracting the tanning matter from the leaves, and in that case they may be boiled in a tub or vat made of wood or other non-corrosive substance.

The leaves to be used for making my improved tanning-liquid should be fully ripe, and they may be gathered after having fallen from the trees, as the action of frost, causing them to fall, has no apparent injurious effect upon them.

In tanning hides or skins with my improved tanning-liquid, the same rules may be observed as in tanning with the common bark-liquor, and the strength of the liquid produced by boiling the leaves should be, before adding the alum, salt, and acid, about ten by barkometer—an instrument understood by all practical tanners.

I have good reason to believe (judging from my experiments and the use of this improved tanning-liquid) that the tanning properties or substances found in the leaves herein described, and extracted by the process of boiling, are of a more refined nature than those found in bark, wood, or berries, and that the leather produced or tanned with my improved tanning-liquid is different from any leather ever before produced.

What I claim as of my invention, and desire to secure by Letters Patent, is—

A tanning-liquid made from the leaves of the oak and the maple, or of the willow, or of the three combined, or by the addition of the leaves of the beech, in about equal proportions, when combined with alum, Glauber's salt, and nitric acid, in about the proportions specified, for the purpose and in the manner set forth.

IRA WOOD.

Witnesses:
NATHAN BROWN,
JOHN E. CRANE.